United States Patent
Girotti et al.

(12) 
(10) Patent No.: US 11,203,660 B2
(45) Date of Patent: Dec. 21, 2021

(54) FOAM FORMULATIONS

(71) Applicant: Dow Global Technologies LLC, Midland, MI (US)

(72) Inventors: Cecilia Girotti, Correggio (IT); Andrea Brandoli, Correggio (IT)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/044,901

(22) PCT Filed: Mar. 19, 2019

(86) PCT No.: PCT/US2019/022865
§ 371 (c)(1),
(2) Date: Oct. 2, 2020

(87) PCT Pub. No.: WO2019/194966
PCT Pub. Date: Oct. 10, 2019

(65) Prior Publication Data
US 2021/0147611 A1    May 20, 2021

(30) Foreign Application Priority Data

Apr. 3, 2018 (IT) .................. 102018000004162

(51) Int. Cl.
| | | |
|---|---|---|
| C08G 18/18 | (2006.01) | |
| C08G 18/32 | (2006.01) | |
| C08G 18/48 | (2006.01) | |
| C08G 18/50 | (2006.01) | |
| C08G 18/66 | (2006.01) | |
| C08G 18/76 | (2006.01) | |
| C08J 9/14 | (2006.01) | |

(52) U.S. Cl.
CPC ..... *C08G 18/7664* (2013.01); *C08G 18/1816* (2013.01); *C08G 18/1833* (2013.01); *C08G 18/3206* (2013.01); *C08G 18/482* (2013.01); *C08G 18/4825* (2013.01); *C08G 18/4829* (2013.01); *C08G 18/4879* (2013.01); *C08G 18/5024* (2013.01); *C08G 18/6674* (2013.01); *C08J 9/146* (2013.01); *C08G 2110/005* (2021.01); *C08J 2203/142* (2013.01); *C08J 2371/02* (2013.01)

(58) Field of Classification Search
CPC .................................................. C08G 18/4879
See application file for complete search history.

(56) References Cited

U.S. PATENT DOCUMENTS

| | | | |
|---|---|---|---|
| 5,023,031 A | 6/1991 | West et al. | |
| 6,306,920 B1 * | 10/2001 | Heinemann ............... | C08J 9/144 521/174 |
| 8,193,257 B2 * | 6/2012 | Morley ............... | C08G 65/2624 521/174 |
| 9,266,991 B2 | 2/2016 | Girotti et al. | |
| 10,144,797 B2 * | 12/2018 | Micheletti .......... | C08G 18/4825 |
| 10,731,052 B2 | 8/2020 | Caillouette et al. | |
| 2002/0086913 A1 | 7/2002 | Roels et al. | |
| 2010/0280140 A1 * | 11/2010 | Morley ............... | C08G 18/5027 521/114 |
| 2011/0196055 A1 | 8/2011 | Kramer et al. | |
| 2012/0172470 A1 | 7/2012 | Morley et al. | |
| 2013/0184366 A1 | 7/2013 | Jimenez et al. | |
| 2014/0213677 A1 | 7/2014 | Jimenez et al. | |
| 2015/0025164 A1 * | 1/2015 | Golini ................ | C08G 18/4833 521/107 |
| 2016/0369077 A1 | 12/2016 | Hu et al. | |
| 2017/0239857 A1 | 8/2017 | Holeschovsky et al. | |

FOREIGN PATENT DOCUMENTS

EP         0858477         5/2008

OTHER PUBLICATIONS

International Search Report & Written Opinion for related PCT Application PCT/US2019/022865, dated May 22, 2019 (12 pgs).
International Preliminary Report on Patentability for related PCT Application PCT/US2019/022865, dated Oct. 15, 2020 (8 pgs).

\* cited by examiner

*Primary Examiner* — Melissa A Rioja
(74) *Attorney, Agent, or Firm* — Brooks, Cameron & Huebsch, PLLC

(57) ABSTRACT

Embodiments of the present disclosure are directed towards foam formulations that include a high functionality polyether polyol, an aromatic polyether polyol, an amine initiated aliphatic polyether polyol, and a diol.

10 Claims, No Drawings

FOAM FORMULATIONS

This application is a National Stage Application under 35 U.S.C. § 371 of International Application Number PCT/US2019/022865, filed Mar. 19, 2019 and published as WO 2019/194966 on Oct. 10, 2019, which claims the benefit to Italian Non-Provisional Application 102018000004162, filed Apr. 3, 2018, the entire contents of which are incorporated herein by reference in its entirety.

FIELD OF DISCLOSURE

Embodiments of the present disclosure are directed towards foam formulations, more specifically, embodiments are directed towards foam formulations that include a high functionality polyether polyol, an aromatic polyether polyol, an amine initiated aliphatic polyether polyol, and a diol.

BACKGROUND

Foams are dispersions in which a gas is dispersed in a liquid material, a solid material, or a gel material. Foams can be formed by a chemical reaction of polyols and isocyanate. Foams can be utilized for a number of various applications, including insulation, bedding, furniture, vehicle seating, and carpet backing, among others.

SUMMARY

The present disclosure provides foam formulations including a polyol composition including: a high functionality polyether polyol that is from 20 to 60 weight percent of a total weight of the polyol composition; an aromatic polyether polyol that is from 5 to 15 weight percent of the total weight of the polyol composition; an amine initiated aliphatic polyether polyol that is from 3 to 10 weight percent of the total weight of the polyol composition; a diol that is from 20 to 60 weight percent of the total weight of the polyol composition, wherein the polyol composition has an average hydroxyl functionality from 3.7 to 6.0; and an isocyanate, wherein the foam formulation forms a foam having a molecular weight per cross-link from 475 to 520.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Foam formulations including a polyol composition that include a high functionality polyether polyol, an aromatic polyether polyol, an amine initiated aliphatic polyether polyol, and a diol are disclosed herein.

Advantageously, the foam, formulations disclosed herein can provide a high average functionality and they can be cured to provide foam products having one or more desirable properties such as greater molecular weight per cross link, i.e. lower crosslink density. Greater crosslink per molecular weight can provide more viscoelastic foams, especially at low ambient temperature, as compared to other foams.

Foam viscoelastic behavior can be determined by Dynamic Mechanical Analysis (DMA) through Tan Delta and Loss modulus measurements as function of temperature. The foam formulations disclosed herein can be cured to provide foam products having an advantageously greater, tan delta at low temperature, e.g., below 0° C., as compared to foams foamed from formulations having lower molecular weight per crosslink. The advantageously increased tan delta indicates that the foams have a greater viscoelasticity. This greater viscoelasticity can indicate that the foam product is better able to dissipate mechanical stress, as compared to foams having relatively lesser tan delta.

The foam formulations disclosed herein include a polyol composition. The polyol composition includes a high functionality polyether polyol, an aromatic polyether polyol, an amine initiated aliphatic polyether polyol, and a diol, as discussed further herein.

As mentioned, the polyol composition of the foam formulations disclosed herein includes a high functionality polyether polyol. As used herein a "high functionality polyol", e.g., the high functionality polyether polyol, refers to a polyol having average functionality, i.e. hydroxyl functionality, that is greater than 5.0. For example, the high functionality polyether polyol can have an average functionality from a lower limit of 5.1, 5.3, 5.5, or 5.8 to an upper limit of 8.0, 7.8, 7.5, or 7.0. The high functionality polyether polyol can be an alcohol initiated polyether polyol, e.g., an alcohol initiated aliphatic or cyclic polyether polyol. An alcohol initiator can have a hydroxyl functionality that is greater than 5.0 and/or an hydroxyl equivalent weight that less than 75 g/mol, e.g., from 15 g/mol to 60 g/mol, 20 g/mol to 50 g/mol, etc. Exemplary alcohol initiators that may be used are sorbitol and/or sucrose (alone or in combination with other initiators).

The high functionality polyether polyol can have an equivalent weight from 75 to 150 g/mol. Equivalent weight can be determined as a quotient of molecular weight and functionality. All individual values and subranges from 75 to 150 g/mol are included; for example, the high functionality polyether polyol can have an equivalent weight from a lower limit of 75, 80, or 85 to an upper limit of 150, 145, or 140 g/mol.

The high functionality polyether polyol can be prepared using known equipment and reaction conditions. The high functionality polyether polyol may be obtained commercially. Examples of commercially available high functionality polyether polyols include, but are not limited to, polyols sold under the trade name VORANOL™ such as VORANOL™ RN 482, and TERCAROL™ both available from The Dow Chemical Company, among others.

The high functionality polyether polyol can be from 20 to 60 weight percent of a total weight of the polyol composition. All individual values and subranges from 20 to 60 weight percent are included; for example, the high functionality polyether polyol can be from a lower limit of 20, 25, or 30 weight percent to an upper limit of 60, 50, or 40 weight percent of the total weight of the polyol composition.

The polyol composition of the foam formulations disclosed herein includes an aromatic polyether polyol. As used herein an "aromatic polyether polyol" refers to a polyol including an aromatic ring. The aromatic polyether polyol may be a Novolac-type polyol.

The aromatic polyether polyol can have an average hydroxyl functionality from 3.0 to 5.0. All individual values and subranges from 3.0 to 5.0 are included; for example, the aromatic polyether polyol can have an average functionality from a lower limit of 3.0, 3.1, or 3.2 to an upper limit of 5.0, 4.5, or 4.0.

The aromatic polyether polyol can have an equivalent weight from 240 to 320 g/mol. Equivalent weight can be determined as a quotient of molecular weight and functionality. All individual values and subranges from 240 to 320 g/mol are included; for example, the high functionality polyether polyol can have an equivalent weight from a lower limit of 240, 245, or 250 g/mol to an upper limit of 320, 315, or 310 g/mol.

The aromatic polyether polyol can be prepared using known equipment and reaction conditions. The aromatic polyether polyol may be obtained commercially. Examples of commercially available aromatic polyether polyols include, but are not limited to, polyols sold under the trade name TERCAROL™ available from The Dow Chemical Company.

As mentioned, the aromatic polyether polyol may be a Novolac-type polyol. Novolac-type polyols are the alkoxylation products of a phenol-formaldehyde resin, which is formed by the reaction of phenol with formaldehyde in the presence of an acid catalyst, such as glacial acetic acid, followed by concentrated hydrochloric acid. As an example, a small amount of the acid catalyst or catalysts can be added to a miscible phenol, such as p-toluenesulfonic acid, followed by formaldehyde. The formaldehyde will react between two phenols to form a methylene bridge, creating a dimer by electrophilic aromatic substitution between the ortho and para positions of phenol and the protonated formaldehyde. This dimer is bisphenol F. Another example is bisphenol A, which is the condensation product of acetone with two phenols. As concentration of dimers increase, trimers, tetramers and higher oligomers may also form. However, because the molar ratio of formaldehyde to phenol is controlled at somewhat less than 1, polymerization is not completed. Thus, the Novolac may then be alkoxylated to build molecular weight to a desired level.

Phenols which may be used to prepare a Novolac initiator include: o-, m-, or p-cresols, ethylphenol, nonylphenol, p-phenylphenol, 2,2-bis(4-hydroxyphenol) propane, beta-naphthol, beta-hydroxyanthracene, p-chlorophenol, o-bromophenol, 2,6-dichloro-phenol, p-nitrophenol, 4-nitro-6-phenylphenol, 2-nitro-4-methylphenol, 3,5-dimethylphenol, p-isopropylphenol, 2-bromo-4-cyclohexylphenol, 4-t-butylphenol, 2-methyl-4-bromophenol, 2-(2-hydroxypropyl)phenol, 2-(4-hydroxyphenol)ethanol, 2-carbethoxyphenol, 4-chloro-methylphenol, and mixtures thereof.

Novolac-type polyols may be produced, for example, by reacting a condensate adduct of phenol and formaldehyde with one or more alkylene oxides including ethylene oxide, propylene oxide, and butylene oxide. Such polyols, sometimes referred to as Novolac-initiated polyols, are known to those skilled in the art, and may be obtained by methods such as are disclosed in, for example, U.S. Pat. Nos. 2,838,473; 2,938,884; 3,470,118; 3,686,101; and 4,046,721; the disclosures of which are incorporated herein by reference in their entireties. Novolac starting materials can be prepared by reacting a phenol (for example, a cresol) with formaldehyde where the molar ratio of formaldehyde to phenol of less than one, in the presence of an acidic catalyst to form a polynuclear condensation product containing from 2.1 to 12, such as from 2.2 to 6, or from 2.5 to 4.5 phenol units per molecule. The Novolac resin is then reacted with an alkylene oxide such as ethylene oxide, propylene oxide, butylene oxide, or isobutylene oxide to form an oxyalkylated product containing a plurality of hydroxyl groups.

The aromatic polyether polyol can be from 5 to 15 weight percent of the total weight of the polyol composition. All individual values and subranges from 5 to 15 weight percent are included; for example, the aromatic polyether polyol can be from a lower limit of 5, 6, or 8 weight percent to an upper limit of 15, 12, or 10 weight percent of the total weight of the polyol composition.

The polyol composition of the foam formulations disclosed herein includes an amine initiated aliphatic polyether polyol. The amine initiated aliphatic polyether polyol can have an average hydroxyl functionality from 2.5 to 5.0. All individual values and subranges from 3.0 to 5.0 are included; for example, the amine initiated aliphatic polyether polyol can have an average functionality from a lower limit of 2.5, 3.0, or 3.2 to an upper limit of 5.0, 4.9, 4.8, 4.7, or 4.5. The amine initiated aliphatic polyether polyol may be initiated by an aliphatic amine have an amino functionality that is less than 5.0 (e.g., greater than 2.5) and/or an amino equivalent weight that less than 60 g/mol (e.g., from 15 g/mol to 60 g/mol, 20 g/mol to 50 g/mol, etc). Exemplary aliphatic amines that may be used include ethylenediamine (alone or in combination with other amine initiators).

The amine initiated aliphatic polyether polyol can have an equivalent weight from 60 to 120 g/mol. All individual values and subranges from 60 to 120 g/mol are included; for example, the amine initiated aliphatic polyether polyol can have an equivalent weight from a lower limit of 60, 65, or 70 g/mol to an upper limit of 120, 115, or 110 g/mol.

The amine initiated aliphatic polyether polyol can be prepared using known equipment and reaction conditions, e.g., a reaction process including an amine and an alkylene oxide in the presence of a catalyst. The amine initiated aliphatic polyether polyol may be obtained commercially. Examples of commercially available amine initiated aliphatic polyether polyols include, but are not limited to, polyols sold under the trade name VORANOL™, such as VORANOL™ RA 500, available from The Dow Chemical Company, among others.

The amine initiated aliphatic polyether polyol can be from 3 to 10 weight percent of the total weight of the polyol composition. All individual values and subranges from 3 to 10 weight percent are included; for example, the amine initiated aliphatic polyether polyol can be from a lower limit of 3, 3.5, or 4 weight percent to an upper limit of 10, 9.5, or 9 weight percent of the total weight of the polyol composition.

The polyol composition of the foam formulations disclosed herein includes a diol. As used herein a "diol" refers to a molecule having an average hydroxyl functionality from 1.5 to 2.4. All individual values and subranges from 1.5 to 2.4 are included; for example, the diol can have an average functionality from a lower limit of 1.5, 1.7, or 1.9 to an upper limit of 2.4, 2.3, or 2.1.

The diol can have an equivalent weight from 200 to 520 g/mol. All individual values and subranges from 200 to 520 g/mol are included; for example, the diol can have an equivalent weight from a lower limit of 200, 205, or 210 g/mol to an upper limit of 520, 515, or 510 g/mol.

Embodiments of the present disclosure provide that the diol can be a polyether diol, a polyester diol, or combinations thereof.

The diol can be prepared using known equipment and reaction conditions. The diol may be obtained commercially. Examples of commercially available diols include, but are not limited to, diols sold under the trade name VORANOL™, such as VORANOL™ P 400 and VORANOL™ P1010, among others.

The diol can be from 20 to 60 weight percent of the total weight of the polyol composition. All individual values and subranges from 20 to 60 weight percent are included; for example, the diol can be from a lower limit of 20, 25, or 30, weight percent to an upper limit of 60, 55, or 50 weight percent of the total weight of the polyol composition.

Embodiments of the present disclosure provide that the polyol composition can include a catalyst. The catalyst may be a blowing catalyst, a gelling catalyst, a trimerization catalyst, or combinations thereof. As used herein, blowing catalysts and gelling catalysts, may be differentiated by a tendency to favor either the urea (blow) reaction, in the case of the blowing catalyst, or the urethane (gel) reaction, in the case of the gelling catalyst. A trimerization catalyst may be utilized to promote reactivity of the foam formulations.

Examples of blowing catalysts, e.g., catalysts that can tend to favor the blow reaction include, but are not limited to, short chain tertiary amines or tertiary amines containing an oxygen. For instance, blowing catalysts include bis-(2-dimethylaminoethyl)ether; pentamethyldiethylene-triamine, triethylamine, tributyl amine, N,N-dimethylaminopropylamine, dimethylethanolamine, N,N,N',N'-tetra-methylethylenediamine, and combinations thereof, among others.

Examples of gelling catalysts, e.g., catalyst that can tend to favor the gel reaction, include, but are not limited to, organometallic compounds, cyclic tertiary amines and/or long chain amines, e.g., that contain several nitrogen atoms, and combinations thereof. Organometallic compounds include organotin compounds, such as tin(II) salts of organic carboxylic acids, e.g., tin(II) diacetate, tin(II) dioctanoate, tin(II) diethylhexanoate, and tin(II) dilaurate, and dialkyltin (IV) salts of organic carboxylic acids, e.g., dibutyltin diacetate, dibutyltin dilaurate, dibutyltin maleate and dioctyltin diacetate. Bismuth salts of organic carboxylic acids may also be utilized as the gelling catalyst, such as, for example, bismuth octanoate. Cyclic tertiary amines and/or long chain amines include dimethylbenzylamine, N,N,N',N'-tetramethylbutanediamine, dimethylcyclohexylamine, triethylenediamine, and combinations thereof, and combinations thereof.

Examples of trimerization catalysts include tris(dialkylaminoalkyl)-s-hexahydrotriazines, such as 1,3,5-tris(N,N-dimethylaminopropyl)-s-hexahydrotriazine; [2,4,6-Tris (dimethylaminomethyl) phenol]; potassium acetate, potassium octoate; tetraalkylammonium hydroxides such as tetramethylammonium hydroxide; alkali metal hydroxides such as sodium hydroxide; alkali metal alkoxides such as sodium methoxide and potassium isopropoxide; and alkali metal salts of long-chain fatty acids having 10 to 20 carbon atoms and, combinations thereof. Some commercially available trimerization catalysts include DABCO® TMR, DABCO® TMR-2, DABCO® TMR-30, DABCO® K 2097; DABCO® K15, POLYCAT® 41, POLYCAT® 43, and POLYCAT® 46, among others.

The catalyst can be from 0.1 to 5.0 weight percent of the total weight of the polyol composition. All individual values and subranges from 0.1 to 5.0 weight percent are included; for example, the catalyst can be from a lower limit of 0.1, 0.2, or 0.3 weight percent to an upper limit of 5.0, 4.5, 4.0, 3.5, 3.4, or 3.3 weight percent of the total weight of the polyol composition.

Embodiments of the present disclosure provide that the polyol composition can include a blowing agent. The blowing agent can be a physical blowing agent, a chemical blowing agent, or combinations thereof.

Examples of physical blowing agents include liquid carbon dioxide; alkanes; cycloalkanes, such as, cyclopentane, cyclohexane, cyclobutane and mixtures thereof; other cycloalkanes having up to 7 carbon atoms; dialkyl ethers, cycloalkylene ethers, fluoroalkanes, hydrofluoroolefins, hydrochlorofluoroolefins, and mixtures thereof. Examples of alkanes include, but are not limited to, propane, butane, n-butane, isobutane, pentane, isopentane and combinations thereof. Examples of dialkyl ethers include dimethyl ether, methyl ethyl ether, methyl butyl ether, diethyl ether, and combinations thereof. An example of a cycloalkylene ether is furan. Examples of fluoroalkanes include, but are not limited to, pentafluoropropane, trifluoromethane, difluoromethane, difluoroethane, tetrafluoroethane, hepta-fluoropropane, pentafluorobutane, heptafluorobutane, and combinations thereof, among others. Examples of hydrofluoroolefins and/or hydrochlorofluoroolefins include, but are not limited to 1,1,1,4,4,5,5,5-octafluoro-2-pentene (HFC-1438mzz), Z-1,1,1,4,4,4-hexafluoro-2-butene (HFC-1336mzz, Z-isomer), trans-1,3,3,3-tetrafluoropropene, 1-chloro-3,3,3-trifluoropropene (HFO-1233zd).

An example of a chemical blowing agent is water.

The blowing agent can be from 1.0 to 8.0 weight percent of the total weight of the polyol composition. All individual values and subranges from 1.0 to 12.0 weight percent are included; for example, the blowing agent can be from a lower limit of 1.0, 1.5, or 2.0 weight percent to an upper limit of 12.0, 11.0, 10.0, 7.0, or 6.0 weight percent of the total weight of the polyol composition.

The polyol compositions disclosed herein may include a surfactant. Examples of surfactants include silicon-based compounds such as silicone oils and organosilicone-polyether copolymers, such as polydimethyl siloxane and polydimethylsiloxane-polyoxyalkylene block copolymers, e.g., polyether modified polydimethyl siloxane, and combinations thereof. Examples of surfactants include silica particles and silica aerogel powders, as well as organic surfactants such as nonylphenol ethoxylates. Surfactants are available commercially and include those available under trade names such as NIAX™, such as NIAX™ L 6900; DABCO®; and TEGOSTAB™ such as TEGOSTAB™ B 8427; among others.

Embodiments of the present disclosure provide that surfactant, when utilized, can be 0.1 to 5.0 weight percent of the total weight of the polyol composition. All individual values and subranges from 0.1 to 5.0 weight percent are included; for example, the surfactant can be from a lower limit of 0.1, 0.2, or 0.3 weight percent to an upper limit of 5.0, 4.0, or 3.0 weight percent of the total weight of the polyol composition.

One or more embodiments of the present disclosure provide that the foam formulations can include one or more additional components. Different additional components and/or different amounts of the additional components may be utilized for various applications. Examples of additional components include pigments, colorants, flame retardants, crosslinkers, chain extenders, antioxidants, bioretardant agents, and combinations thereof, among others.

The polyol compositions of the foam formulations disclosed herein have an average hydroxyl functionality from 3.7 to 6.0. Average functionality of the polyol composition can be determined as a quotient of total moles of OH in the polyol composition and total moles of a combination of the high functionality polyether polyol, the aromatic polyether polyol, the amine initiated aliphatic polyether polyol, and the diol in the polyol composition. All individual values and subranges from 3.7 to 6.0 are included; for example, the polyol composition can have an average functionality from a lower limit of 3.7, 3.6, or 3.5 to an upper limit of 6.0, 5.8, or 5.7.

The polyol compositions of the foam formulations disclosed herein can have an OH number from 270 to 410. OH number can be determined from a wet analytical method for the hydroxyl content of a polyol as milligrams of potassium hydroxide equivalent to the hydroxyl content in one gram of polyol or other hydroxyl compound. OH number can be expressed by the following formula $$\text{OH Number} = \frac{56.1 \times 1000}{\text{Equivalent Weight}}$$

where 56.1 is the atomic weight of potassium hydroxide and 1000 is a number of milligrams in one gram of sample. The OH number for the polyol compositions of the foam formulations disclosed herein can be determined as the sum of the respective OH numbers of the high functionality polyether polyol, the aromatic polyether polyol, the amine initiated aliphatic polyether polyol, and the diol.

All individual values and subranges from 270 to 410 are included; for example, the polyol composition can have an OH number from a lower limit of 270, 280, or 290 to an upper limit of 410, 400, or 390.

As mentioned, the foam formulations disclosed herein can include an isocyanate. The isocyanate may be a polyisocyanate. As used herein, "polyisocyanate" refers to a molecule having an average of greater than 1.0 isocyanate groups/molecule, e.g. an average functionality of greater than 1.0.

The isocyanate can be an aliphatic polyisocyanate, a cycloaliphatic polyisocyanate, an araliphatic polyisocyanate, an aromatic polyisocyanate, or combinations thereof, for example. Examples of isocyanates include, but are not limited to, toluene 2,4-/2,6-diisocyanate (TDI), methylenediphenyl diisocyanate (MDI), polymeric MDI, triisocyanatononane (TIN), naphthyl diisocyanate (NDI), 4,4'-diisocyanatodicyclohexylmethane, 3-isocyanatomethyl-3,3,5-trimethylcyclohexyl isocyanate (isophorone diisocyanateIIPDI), tetramethylene diisocyanate, hexamethylene diisocyanate (HDI), 2-methylpentamethylene diisocyanate, 2,2,4-trimethylhexamethylene diisocyanate (THDI), dodecamethylene diisocyanate, 1,4-diisocyanatocyclohexane, 4,4'-diisocyanato-3,3'-dimethyldicyclohexylmethane, 4,4'-diisocyanato-2,2-dicyclohexylpropane, 3-isocyanatomethyl-1-methyl-1-isocyanatocyclohexane (MCI), 1,3-diisooctylcyanato-4-methylcyclohexane, 1,3-diisocyanato-2-methylcyclohexane, and combinations thereof, among others. As well as the isocyanates mentioned above, partially modified polyisocyanates including uretdione, isocyanurate, carbodiimide, uretonimine, allophanate or biuret structure, and combinations thereof, among others, may be utilized.

The isocyanate can be polymeric. As used herein "polymeric", in describing the isocyanate, refers to higher molecular weight homologues and/or isomers. For instance, polymeric methylene diphenyl isocyanate refers to a higher molecular weight homologue and/or an isomer of methylene diphenyl isocyanate.

As mentioned, the isocyanate can have an average functionality of greater than 1.0 isocyanate groups/molecule. For instance, the isocyanate can have an average functionality from 1.75 to 3.50. All individual values and subranges from 1.75 to 3.50 are included; for example, the isocyanate can have an average functionality from a lower limit of 1.75, 1.85, or 1.95 to an upper limit of 3.50, 3.40 or 3.30.

The isocyanate can have an isocyanate equivalent weight 125 g/eq to 300 g/eq. All individual values and subranges from 125 to 300 g/eq are included; for example, the isocyanate can have an isocyanate equivalent weight from a lower limit of 125, 135, or 145 to an upper limit of 300, 290, or 280 g/eq.

The isocyanate may be prepared by a known process. For instance, the polyisocyanate can be prepared by phosgenation of corresponding polyamines with formation of polycarbamoyl chlorides and thermolysis thereof to provide the polyisocyanate and hydrogen chloride, or by a phosgene-free process, such as by reacting the corresponding polyamines with urea and alcohol to give polycarbamates, and thermolysis thereof to give the polyisocyanate and alcohol, for example.

The isocyanate may be obtained commercially. Examples of commercial isocyanates include, but are not limited to, polyisocyanates under the trade names VORANATE™, such as VORANATE™ M 220, and PAPI™ available from The Dow Chemical Company, among other commercial isocyanates.

The isocyanate can be utilized such that the foam formulation has an isocyanate index in a range from 100 to 125. Isocyanate index can be determined as a quotient, multiplied by one hundred, of an actual amount of isocyanate utilized and a theoretical amount of isocyanate for curing. All individual values and subranges from 100 to 125 are included; for example, the foam formulation can have an isocyanate index from a lower limit of 100, 105, or 110 to an upper limit of 125, 120, or 115.

The foam formulations disclosed herein can be cured to form a foam product. The foam products can be prepared using known methods and conditions, which may vary for different applications. One or embodiments of the present disclosure provide a process for forming a foam product. The process includes curing the foam formulations disclosed herein. The process may utilize known equipment and conditions, such as a one shot process, among others.

The foam product disclosed herein may be a closed-cell foam. As used herein, a "closed-cell foam" refers to a foam having an open cell volume percentage of less than or equal to 10 percent. The foam product can have an open cell volume percentage from 3 volume percent to 10 volume percent. All individual values and subranges from 3 to 10 volume percent are included; for example, the foam product can have an open cell volume percentage from a lower limit of 3, 4, or 5 volume percent to an upper limit of 10, 9, or 8 volume percent.

The foam product disclosed herein may have a molecular weight per cross-link from 475 to 520. Molecular weight per cross-link may be determined as discussed further herein. All individual values and subranges from 475 to 520 are included; for example, the foam product can have a molecular weight per cross-link from a lower limit of 475, 480, or 485 to an upper limit of 520, 515, or 510.

As mentioned, the foam products disclosed herein can have one or more advantageous properties, as compared to other foams. For instance, the foam products disclosed herein can have an advantageously greater tan delta, and/or an advantageously greater loss modulus, as compared to foams formed from other formulations.

Additionally, the foam formulations disclosed herein can be cured to provide foam products having advantageously improved, i.e. reduced, liner deformation, as compared to foam formed from other formulations. Reduced liner deformation may be desirable for a number of applications, for instance where foams are subjected to high thermal shocks immediately after production. One example, as will be evident to those in the art, of such applications is water heaters foamed with a minimal over-packing without the use of a structural support. This type of water heater is associated with more liner deformation, as compared to other water heaters produced with a standard molding process.

Examples

In the Examples, various terms and designations for materials are used including, for instance, the following:

VORANOL™ RN 482 (high functionality polyether polyol; aliphatic polyether polyol; sorbitol initiated propoxylated polyol; average functionality 6.0; equivalent weight 117 g/mol; obtained from the Dow Chemical Company); VORANOL™ CP 1055 (aliphatic polyether polyol; average functionality 3.0; equivalent weight 360 g/mol; obtained from the Dow Chemical Company); VORANOL™ 280 (high functionality polyether polyol; aliphatic polyether polyol; sucrose/glycerine initiated propoxylated polyol; average functionality 7.0; equivalent weight 200 g/mol; obtained from the Dow Chemical Company); VORANOL™ P 400 (diol; aliphatic polyether diol; average functionality 2.0; equivalent weight 214 g/mol; obtained from The Dow Chemical Company); aromatic polyether polyol-A (average functionality 3.3; equivalent weight 286 g/mol; aromatic resin-initiated oxypropylene-oxyethylene polyol (Novolac-type polyol)); VORANOL™ P1010 (diol; aliphatic polyether diol; average functionality 2.0; equivalent weight 510 g/mol; obtained from The Dow Chemical Company); VORANOL™ RA 500 (amine initiated aliphatic polyether polyol; ethylenediamine initiated propoxylated polyol; average functionality 4.0; equivalent weight 112 g/mol; obtained from the Dow Chemical Company); VORANOL™ CP 450 (aliphatic polyether polyol; average functionality 3.0; equivalent weight 148 g/mol; obtained from The Dow Chemical Company); VORANOL™ CP 260 (aliphatic polyether polyol; average functionality 3.0; equivalent weight 85 g/mol; obtained from The Dow Chemical Company); VORANOL™ RH 360 (aliphatic polyether polyol; average functionality 4.6; equivalent weight 156 g/mol; obtained from the Dow Chemical Company); dimethylcyclohexylamine [DMCHA] (gelling catalyst; obtained from BordsoChem); NIAX™ A1 (blowing catalyst; bis(dimethyl aminoethyl)ether 70% active in DPG; obtained from MOMENTIVE™); pentamethyldiethylene-triamine [PMDETA](blowing catalyst; obtained from Evonik); dimethylbenzylamine [DMBA] (gelling catalyst; obtained from MOMENTIVE™); DABCO© TMR-2 (trimerization catalyst, obtained from EVONIK™); TEGOSTAB™ B 8427 (surfactant; obtained from Evonik); NIAX™ L 6900 (surfactant; obtained from MOMENTIVE™); HFC 245fa (pentafluoropropane; physical blowing agent; obtained from Honeywell); HFC 134a (tetrafloroethane; physical blowing agent; obtained from Arkema); HFC 365mfc/HFC 227ea (pentafluorobutane/heptafluorobutane blend; physical blowing agent; obtained from Solvay); VORANATE™ M 220 (isocyanate; polymeric MDI; obtained from the Dow Chemical Company); triethyl phosphate (flame retardant; obtained from Quimidroga).

Examples 1-2, foam formulations, were prepared as follows. For each Example, the items listed in Table 1 were combined in a respective container by mixing.

Comparative Examples A-C were prepared as Examples 1-2, with the change that the items indicated in Table 1 were respectively utilized.

TABLE 1

| | Example 1 | Example 2 | Comparative Example A | Comparative Example B | Comparative Example C |
|---|---|---|---|---|---|
| VORANOL™ RN 482 | 34.0 g | 33.2 g | 12.0 g | — | — |
| VORANOL™ CP 1055 | — | — | 10.5 g | — | — |
| VORANOL™ 280 | — | — | — | 17.5 g | — |
| VORANOL™ P 400 | 32.7 g | 31.5 g | — | — | — |
| aromatic polyether polyol-A | 9.3 g | 9.0 g | — | — | — |
| VORANOL™ P1010 | 9.0 g | 9.0 g | — | — | — |
| VORANOL™ RA 500 | 5.0 g | 5.0 g | — | — | — |
| VORANOL™ CP 450 | — | — | 52.0 g | 45.1 g | — |
| VORANOL™ CP 260 | — | — | 15.5 g | 22.0 g | — |
| VORANOL™ RH 360 | — | — | — | — | 82.5 g |
| water | 3.5 g | 3.5 g | 3.5 g | 3.4 g | 3.4 g |
| DMCHA | — | 0.4 g | — | 0.9 g | 0.8 g |
| NIAX™ A1 | 0.5 g | 0.1 g | 0.5 g | 0.1 g | — |
| PMDETA | — | — | — | — | 0.2 g |
| DMBA | — | 2.0 g | — | 2.0 g | — |
| DABCO® TMR-2 | — | 0.3 g | — | — | 0.5 g |
| TEGOSTAB™ B 8427 | — | — | — | 2.0 | — |
| NIAX™ L 6900 | 2.0 g | 2.0 g | 2.0 g | — | 1.9 g |
| HFC 245fa | 4.0 g | 4.0 g | 4.0 g | — | — |
| HFC 134a | — | — | — | 3.0 g | 3.0 g |
| HFC 365mfc/HFC 227ea | — | — | — | 4.0 g | — |
| VORANATE™ M 220 | 145 g | 142 g | 160 g | 154 g | 136 g |
| Triethyl phosphate | — | — | — | — | 7.7 g |

Isocyanate index, OH number, and average functionality were each determined for Examples 1-2 and Comparative Examples A-C; the results are reported in Table 3.

TABLE 3

|  | Example 1 | Example 2 | Comparative Example A | Comparative Example B | Comparative Example C |
|---|---|---|---|---|---|
| Isocyanate index | 115 | 114 | 111 | 110 | 110 |
| OH number | 303 | 296 | 377 | 370 | 300 |
| Average functionality | 4.02 | 4.02 | 3.39 | 3.38 | 4.00 |

Examples 3-4, foam products, and Comparative Examples D-F were formed by respectively curing Examples 1-2 and Comparative Examples A-C once reacted with isocyanate under one shot condition, as follows.

Each sample was prepared with a high-pressure Cannon A 40 laboratory machine having a mix-head attached to a mold injection hole. The respective components of Examples 1-2 and Comparative Examples A-C were injected together with isocyanate at a defined mixing ratio, into an aluminum Brett mold at a mix-head pressure of approximately 150 bar. The Brett mold was 200 cm long, 20 cm wide and 5 cm deep and maintained at about 45° C. A release agent was applied to the Brett mold prior to injection to facilitate demolding. The Brett mold included venting holes, to facilitate air flow outside the mold during foaming. Each of Examples 1-2 and Comparative Examples A-C were respectively maintained in the Brett mold for a period of time to undergo foaming and form foam products, Examples 3-4 and Comparative Examples D-F.

For each of Examples 3-4, and Comparative Examples D-F, gel time, molded density, average density deviation compressive strength, k-factor at 10° C., k-factor at 24° C., open cell percentage, and molecular weight per cross-link were determined. The results are reported in Table 4.

Gel time was determined by observation as follows. Gel time is determined as the time in seconds from the beginning of the mixing process until a string can be pulled from the rising foam using a tongue depressor.

Molded density was determined according to ASTM 1622-88.

Average density deviation (ADD) was determined by from 17 specimens (20 cm×10 cm×5 cm) formed in the Brett mold, utilizing the following formula:

$$ADD = \sum_{I=1}^{17} \frac{|\bar{d} - di|}{17}$$

Where, $d_i$ is the density of the $i^{th}$ sample, $\bar{d}$ (overbar) is the average density, and 17 is the number of samples.

Compressive strength was determined according to ASTM D 1621, utilizing 10 cm×10 cm×5 cm portions.

K-factor was determined according to EN 12667.

Open cell percentage determined according to ASTM D 6226.

Molecular weight per cross-link was determined by the following formula:

$$M_c = \frac{W_{POL} + W_{ISO}}{\frac{W_{POL}(F_{POL} - 2)}{E_{POL} \times F_{POL}} + \frac{W_{ISO,STOICH}(F_{ISO} - 2)}{E_{ISO} \times F_{ISO}} + \frac{W_{ISO,EXC}(F_{ISO} - 1)}{E_{ISO} \times (F_{ISO} + 1)}}$$

where $M_c$ is the molecular weight per cross-link, $W_{POL}$ is a combined weight of polyol utilized to form the foam, $W_{ISO, STOICH}$ is a weight of the stoichiometric amount of isocyanate in grams, $W_{ISO, EXC}$ is a weight of the isocyanate exceeding the stoichiometric amount of isocyanate, $F_{ISO}$ is a numerical average functionality of the isocyanate, $F_{POL}$ is a numerical average functionality of the polyol utilized, $E_{ISO}$ is an equivalent weight of the isocyanate, and $E_{POL}$ is an equivalent weight of the polyol utilized.

TABLE 4

|  | Example 3 | Example 4 | Comparative Example D | Comparative Example E | Comparative Example F |
|---|---|---|---|---|---|
| Gel time (seconds) | 57 | 53 | 80 | 55 | 55 |
| Molded density (kg/m³) | 38.3 | 40.4 | 39.6 | 36.9 | 39.0 |
| Average density deviation | 0.172 | 0.769 | 0.210 | 0.682 | 0.585 |
| Compressive strength (kPa) | 172 | 168 | 167 | 153 | 166 |
| k-factor at 10° C. (mW/mK) | 21.2 | 21.2 | 21.9 | 21.4 | 21.5 |
| k-factor at 24° C. (mW/mK) | 22.9 | 23.0 | 23.9 | 23.2 | 23.3 |
| Open cell percentage (volume percent) | 7.1 | 7.8 | 8.9 | 9.8 | 7.0 |
| Molecular weight per cross-link | 498 | 496 | 471 | 463 | 415 |

The data of Table 4 illustrates each of Example 3 and Example 4 have an advantageous, i.e. greater, molecular weight per cross-link, as compared to each of Comparative Examples D-F.

Dynamic Mechanical Analysis (DMA) was performed on foam samples obtained from Examples 3-4 and Comparative Examples D-F utilizing a Q800 machine from TA Instrument. The measurement was performed with dual cantilever set up; with an oscillation frequency of 1 Hz and a temperature ramp of 3° C./minute from −50 up to 200° C. The results are reported in Table 5.

TABLE 5

|  | Example 3 | Example 4 | Comparative Example D | Comparative Example E | Comparative Example F |
| --- | --- | --- | --- | --- | --- |
| Tan Delta −20° C. | 0.04019 | 0.04379 | 0.03888 | 0.03098 | 0.03554 |
| Tan Delta −10° C. | 0.04134 | 0.04382 | 0.03944 | 0.03160 | 0.03641 |
| Loss Modulus −20° C. (Mpa) | 0.4629 | 0.5928 | 0.3988 | 0.3453 | 0.4369 |
| Loss Modulus −10° C. (Mpa) | 0.4631 | 0.5816 | 0.3956 | 0.3430 | 0.4361 |

The data of Table 5 illustrates each of Example 3 and Example 4 have an advantageous i.e. greater, tan delta, at both −10° C. and −20° C., as compared to each of Comparative Examples D-F. Further, the data of Table 5 illustrates each of Example 3 and Example 4 have an advantageous, i.e. greater, loss modulus, at both −10° C. and −20° C., as compared to each of Comparative Examples D-F.

Example 5, a foam product, was prepared by injecting the composition utilized for Example 1 (360 g) and VORANATE™ M 220 (560 g) into a water heater (80-liter capacity). One hour after injection, the water heater was placed into a −20° C. environment for one week, after which the water heater was visually observed for liner deformation and foam cracks. The results are reported in Table 6.

Comparative Examples G and H were prepared as Example 5, with the change that Comparative Examples 2 and 3 were respectively used, rather than Example 1.

TABLE 6

|  | Example 5 | Comparative Example G | Comparative Example H |
| --- | --- | --- | --- |
| Liner deformation | None observed | Liner deformation observed | Liner deformation observed |
| Foam cracks | None observed | None observed | None observed |

The data of Table 6 illustrates that advantageously no liner deformation was observed for Example 5, while liner deformation was observed for both Comparative Example G and Comparative Example H.

What is claimed:

1. A foam formulation comprising:
    a polyol composition including:
        a high functionality polyether polyol that is from 20 to 60 weight percent of a total weight of the polyol composition;
        an aromatic polyether polyol that is from 5 to 15 weight percent of the total weight of the polyol composition;
        an amine initiated aliphatic polyether polyol that is from 3 to 10 weight percent of the total weight of the polyol composition;
        a diol that is from 20 to 60 weight percent of the total weight of the polyol composition,
        wherein the polyol composition has an average hydroxyl functionality from 3.7 to 6.0; and
    an isocyanate,
        wherein the foam formulation forms a foam having a molecular weight per cross-link from 475 to 520.

2. The foam formulation of claim 1, wherein the foam formulation has an isocyanate index from 100 to 125.

3. The foam formulation of claim 1, wherein the high functionality polyether polyol has an average hydroxyl functionality from 5.1 to 8.0 and an equivalent weight from 75 to 150 g/mol.

4. The foam formulation of claim 1, wherein the amine initiated aliphatic polyether polyol has an average hydroxyl functionality from 2.5 to 5.0 and an equivalent weight from 60 to 120 g/mol.

5. The foam formulation of claim 1, wherein the aromatic polyether polyol has an average hydroxyl functionality from 3.0 to 5.0 and an equivalent weight from 240 to 320 g/mol.

6. The foam formulation of claim 1, wherein the diol has an equivalent weight from 200 to 520 g/mol.

7. The foam formulation of claim 1, including a catalyst wherein the catalyst is selected from blowing catalysts, gelling catalysts, trimerization catalysts, or combinations thereof and a blowing agent, wherein the blowing agent is selected from physical blowing agents, chemical blowing agents, or combinations thereof.

8. A foam product formed by curing the foam formulation of claim 1.

9. The foam product of claim 8, wherein the foam product has an open cell volume percent from 3.0 to 10.0.

10. A process for forming a foam product, the process comprising:
    curing the foam formulation of claim 1.

* * * * *